(12) United States Patent
Lawlor et al.

(10) Patent No.: US 12,447,305 B2
(45) Date of Patent: Oct. 21, 2025

(54) SYSTEMS AND METHODS FOR ANALYZING, MANAGING AND IMPROVING SLEEP

(71) Applicant: CONSUMER SLEEP SOLUTIONS LLC, Carlsbad, CA (US)

(72) Inventors: Colin Lawlor, San Diego, CA (US); Roy Raymann, Vista, CA (US)

(73) Assignee: Consumer Sleep Solutions LLC, Carlsbad, CA (US)

( * ) Notice: Subject to any disclaimer, the term of this patent is extended or adjusted under 35 U.S.C. 154(b) by 569 days.

(21) Appl. No.: 17/496,313

(22) Filed: Oct. 7, 2021

(65) Prior Publication Data

US 2022/0133221 A1 May 5, 2022

Related U.S. Application Data

(60) Provisional application No. 63/088,950, filed on Oct. 7, 2020, provisional application No. 63/088,933, filed
(Continued)

(51) Int. Cl.
*G16H 40/63* (2018.01)
*A61B 5/00* (2006.01)
(Continued)

(52) U.S. Cl.
CPC .......... *A61M 21/00* (2013.01); *A61B 5/1112* (2013.01); *A61B 5/1113* (2013.01); *A61B 5/4809* (2013.01); *A61B 5/4815* (2013.01); *A61B 5/486* (2013.01); *A61B 5/7275* (2013.01); *A61B 5/746* (2013.01); *A61B 5/7475* (2013.01); *G16H 40/63* (2018.01); *G16H 50/30* (2018.01); *A61B 2560/0242* (2013.01); *A61M 2021/0016* (2013.01); *A61M 2021/0027* (2013.01);
(Continued)

(58) Field of Classification Search
None
See application file for complete search history.

(56) References Cited

U.S. PATENT DOCUMENTS

2011/0015495 A1* 1/2011 Dothie ................. A47C 31/123
600/300
2019/0224443 A1* 7/2019 Jantunen ............. A61B 5/4812
(Continued)

OTHER PUBLICATIONS

Imtiaz et al. ("Recommendations for performance assessment of automatic sleep staging algorithms," 2014 36th Annual International Conference of the IEEE Engineering in Medicine and Biology Society, Chicago, IL, USA, 2014, pp. 5044-5047) (Year: 2014).*
(Continued)

*Primary Examiner* — Christopher B Tokarczyk
(74) *Attorney, Agent, or Firm* — FisherBroyles LLP; James P. Cleary

(57) ABSTRACT

Systems and methods for analyzing, managing, and improving a user's sleep are provided. In an example, a sleep score is calculated for the user's previous night's sleep based on a physiological status of the user, and an assessment of the sleep is received on the current day entered by the user or determined by a sleep monitor device, and based on the discrepancy between the calculated score and the assessment, a recommendation is provided to the user.

8 Claims, 5 Drawing Sheets

Related U.S. Application Data on Oct. 7, 2020, provisional application No. 63/088,946, filed on Oct. 7, 2020.

(51) Int. Cl.
*A61B 5/11* (2006.01)
*A61M 21/00* (2006.01)
*G16H 50/30* (2018.01)

(52) U.S. Cl.
CPC ............... *A61M 2021/0044* (2013.01); *A61M 2021/0083* (2013.01); *A61M 2230/63* (2013.01)

(56) References Cited

U.S. PATENT DOCUMENTS

| | | | |
|---|---|---|---|
| 2019/0251858 A1* | 8/2019 | Baharav | G09B 5/08 |
| 2020/0075167 A1* | 3/2020 | Srivastava | G16H 20/30 |
| 2022/0051770 A1* | 2/2022 | Barkol | G16H 80/00 |

OTHER PUBLICATIONS

International Search Report and Written Opinion on PCT/US2021/053945, mailed on Jan. 25, 2022.

\* cited by examiner

SYSTEMS AND METHODS FOR ANALYZING, MANAGING AND IMPROVING SLEEP

BACKGROUND OF THE INVENTION

The present invention relates to sleeping aids, and more particularly, to methods and devices to monitor and manage a user's sleep.

A prevalent and often overlooked cause to many secondary health and social problems is insufficient and/or poor-quality sleep. Estimates show that that 65% of the population has at least a few nights a week suboptimal sleep. Humans require considerable rest each night and if the sleep is broken, brain function, problem-solving, cognitive skills, and reasoning are affected. Other potential consequences of insufficient sleep include short and long-term memory loss, mood changes, a weakened immunity, high blood pressure, weight gain, insulin control, which increases the risk for Type 2 diabetes, heart disease, poor balance, and a lower sex drive. Insufficient and poor-quality sleep will also affect a person's work performance, and likely disrupt their social behavior and social interactions, potentially damaging relationships.

Various methods of improving a person's sleep include physical exercise, breathing exercises and optimizing the user's ambient conditions such as music, light, temperature etc. A variety of monitoring and sleep improvement products have been (or are) on the market, including wearable devices such as wristwatches, armbands, head mounted devices, and non-contact products.

It is an object of the present invention to provide methods and devices to monitor sleep behavior and manage sleep which overcome the deficiencies of the prior art.

SUMMARY

The present invention provides devices, systems, and computer-implemented methods relating to measuring, analyzing, managing and/or improving sleep. The sleep monitoring devices can be any sleep measurement device. The sleep management aspects can be linked to personal situation of the user and can provide personalized awareness regarding factors that impact sleep rather than generic sleep improvement tips. Various factors (activities, exercises, food intake, etc.) in the daytime and sleep disrupting factor in the night-time (noise, light, temperature etc) of a user impacting the user's sleepiness and sleep are included in the methods, rather than only triggering behavioral change of the sleeper, which is the more common starting point for personalized sleep improvement.

In one aspect, a computer-implemented method for improving sleep of a user is provided, which comprises: based on a user profile including biographical information of the user and information provided by one or more devices measuring activity or physiological status of the user, and by using at least one computer processor, calculating a sleep score of the user's previous night's sleep indicative of a quality of the sleep; receiving an assessment of the sleep entered by the user on the current day or by a monitor device measuring the quality of the user's previous night's sleep; and based on a discrepancy between the calculated score and the assessment, by using at least one computer processor, providing a recommendation to the user on an electronic device user interface. In some embodiments of the method, the recommendation is a modification of the user's projected or planned activity. In some embodiments, the assessment of the sleep is by a radar/sonar based monitor device.

In another aspect, the present invention provides a computer-implemented method for improving sleep of a user, which comprises: based on a user profile including biographical information of the user and information provided by one or more electronic devices measuring activity or physiological status of the user, calculating, by using at least one computer processor, a sleep score of the user's upcoming night's sleep indicative of a quality of the sleep; and providing one or more recommendations to the user on an electronic device interface for the user to improve the user's upcoming night's sleep. In some embodiments, the method further comprises tracking the user's actions to thereby calculate a current sleep fuel value for predicting the current night's sleep quality. In some embodiments, the method further comprises showing the current sleep fuel value to the user on an electronic device user interface. The user interface may comprise a gauge showing the current value, and optionally a target value. In some embodiments, calculating the current sleep fuel score comprises using signals received from one or more monitoring devices indicating the user's activity, and/or comprises using an input provided by the user. In some embodiments, calculating the current sleep fuel score comprises scoring a decision provided by the user. In some embodiments, calculating the sleep score comprises assigning a weight to each of a plurality of factors including environmental factors such as air quality and the user's physical activity such as amount of exercise and type of activities engaged by the user.

In some embodiments, providing the recommendation is in response to a query from the user. In some embodiments, the method further comprises by using at least one processor, performing an action in accordance with the recommendation provided, such as playing music to the user.

In another aspect, a computer-implemented method for improving sleep of a user is provided, which comprises: based on a user profile including biographical information of the user and information provided by one or more electronic devices measuring activity or physiological status of the user, and by using at least one computer processor, calculating a sleep score of the user's upcoming night's sleep indicative of a quality of the sleep; and by using at least one computer processor, calculating a recommended bedtime for the current day to the user based on at least one or more of the following: the previous night's sleep, a sleep score entered by user, expected activity of the day, and scheduled events of the next day.

In some embodiments of the method, calculating the recommended bedtime comprises updating the recommended bedtime based on the user's compliance with a predetermined schedule. In some embodiments, calculating the recommended bedtime comprises updating the recommended bedtime based on the user's input.

In some embodiments, the method further comprises detecting if the user follows the recommended bedtime, and if the user does not follow the recommended bedtime, presenting to the user on an electronic device user interface one or more questions.

In some embodiments, the method further comprises detecting if the user follows the recommended bedtime, and if the user does not follow the recommended bedtime, presenting to the user on an electronic device user interface his or her predicted sleep score for the upcoming night's sleep.

In some embodiments, the method further comprises providing a recommendation on an electronic device user interface to the user regarding taking an action or avoiding an action to improve or avoid adversely affecting the user's upcoming night's sleep.

In another aspect, a computer-implemented method for managing sleep of a plurality of individuals is provided, which comprises: monitoring the sleep of a plurality of individuals in a prescribed period of time; by using at least one processor, determining at least one person from the plurality of individuals as having sleep-related issue; and by using at least one processor, providing a recommendation to the at least one person on an electronic user interface. In some embodiments of the method, the recommendation to the at least one person is that she or he goes to bed later than one or more others in the plurality of individuals for a predetermined amount of time.

In another aspect, a computer-implemented method for managing sleep of a plurality of individuals is provide, which comprises: monitoring the sleep of a plurality of individuals in a prescribed period of time; and by using at least one processor, determining which of the plurality of individuals to be awaken to attend to a disruption during the sleep. In some embodiments, the determining comprises taking into account of a characteristic or past history of each of the individuals. In some embodiments, the method further comprises providing a recommendation on an electronic user interface to the one who has been determined to be awaken concerning his or her next day's activity.

In a further aspect, the present invention provides a computer-implemented method of monitoring at least two individuals' sleep using at least two monitoring devices, where a first of the monitoring devices is positioned proximal to a first individual, and a second of the monitoring devices is positioned proximal to a second individual. The method comprises: determining or obtaining the bedtime of each of the first and second individuals; and based on the determined or obtained bedtime, and by using at least one computer processor, activating either the first or the second monitoring device to record body movements of the corresponding first individual or second individual. In some embodiments, the method further comprises receiving and analyzing signals from a further electronic device (such as a smartphone) other than the first and the second monitor device, to thereby confirm the correct first or second monitoring device is activated. The signals from the further electronic device (e.g., a smartphone) are recorded sound signals produced by the first or second individual. The one or both of the monitor devices comprise a sonar or radar based device.

In another aspect, the present invention provides a computer-implemented method of determining the cause of a disruption of the sleep of a first user, the first user has a sleep partner being a second user. The method comprises: monitoring the sleep of the first user and the second user; determining a disruption of the first user's sleep; and correlating the disruption with measured movements of the second user. The disruption can be the awakening of the first user.

In another aspect, the present invention provides a computer-implemented method for analyzing the sleep of at least one user, the method comprising: performing a first measurement of the sleep of the user under a first environmental condition to determine a baseline level of quality of sleep for the user; by using at least one computer processor, changing the first environmental condition to a second, different environmental condition; performing a second measurement of the sleep of the user under the second environmental condition; and comparing the second measurement results with the first measurement results to determine the effect of the change from the first environmental condition to the second environmental condition.

In some embodiments of the method, the second environmental condition differs from the first environmental conditions in at least the sound level of the room where the user sleeps. In some embodiments, performing the first measurement or performing the second measurement comprises measuring the user's body movements.

In a further aspect, the present invention provides a computer-implemented method for analyzing the sleep of at least one user (which may include a plurality of users sleeping within a common room or a predefined geographical location), the method comprising: monitoring the at least one user's sleep using at least one monitoring device; measuring at least one environmental condition during the at least one user's sleep; and analyzing the effect of the at least one environmental condition on the at least one user's sleep. In some embodiments, the method further comprises providing a recommendation to the user on an electronic user interface about a proposed change in an environmental condition of the room. The at least one environment condition can include ambient temperature, humidity, air quality, sound or noise level, light level, and vibration level.

In some embodiments, the method further comprises calculating, using at least one computer processor, a score indicating the suitability of the environment to the user's sleep. The calculating can include calculating a plurality of scores for different time slots of a day.

In a further aspect, the present invention provides a system or a monitor device comprising at least one computer processor and an associated memory, where the memory stores instructions which when executed by the at least one processor, cause the system or monitor device to perform the various embodiments of the methods as described herein.

In a further aspect, the present invention provides a tangible computer-readable storage medium which includes a computer program product (or software), which when executed by at least one processor of a computing device or system, causes the device or system to perform the various embodiments of the methods as described herein.

DETAILED DESCRIPTION

The present disclosure provides systems, computer readable storage media, computer-implemented methods, software application program adapted to operate on portable electronic devices, e.g., a smart phone or a personal monitor, or a server or cloud, for analyzing, managing, and improving a user's sleep. As used herein, the term "user" refers to a person or individual.

Sleep Monitor

Figure 1:
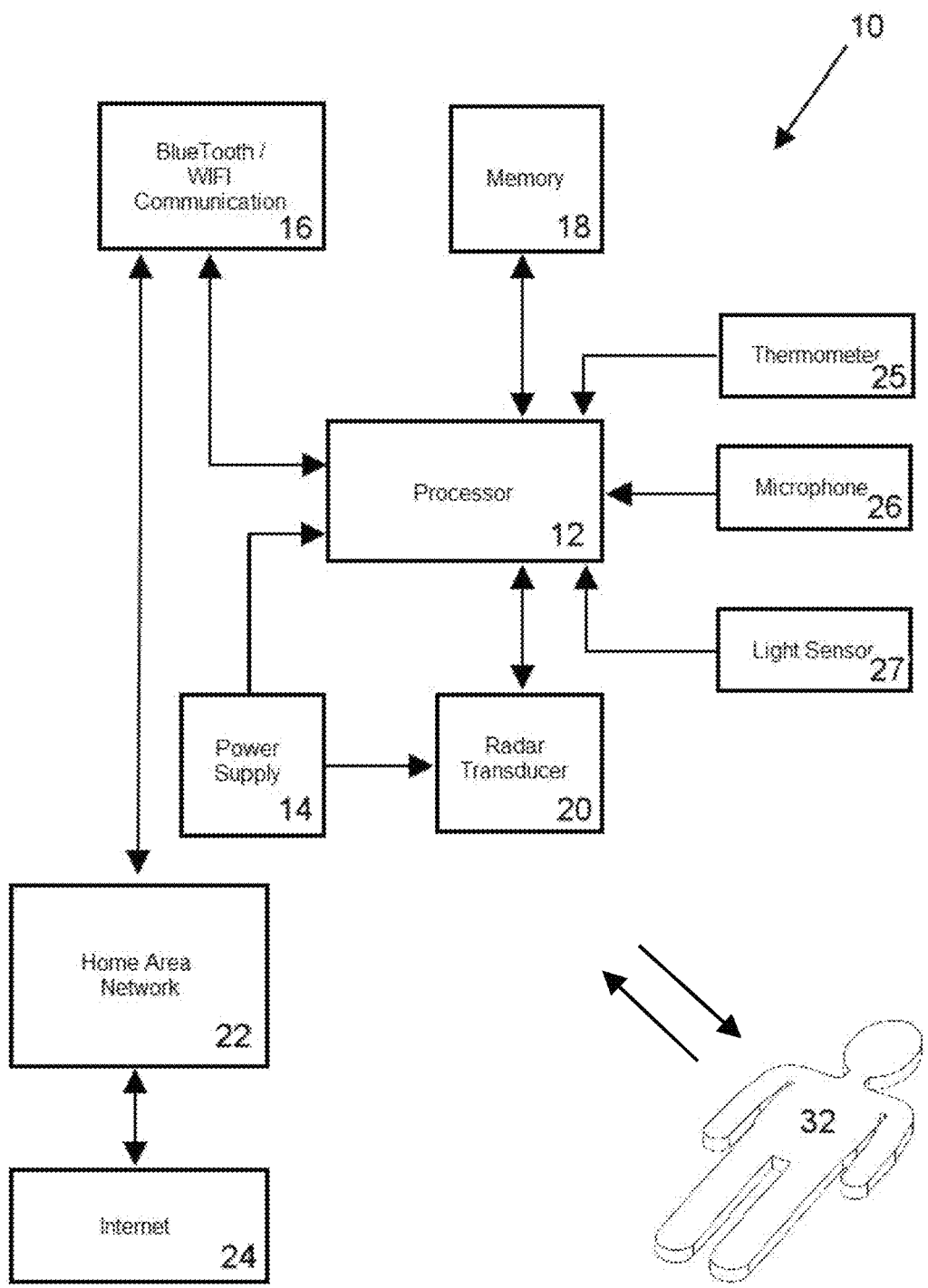
FIG. 1 is a block diagram schematic of a sleep monitor according to certain embodiments of the present invention.

Referring to FIG. 1, and according to some embodiments of the present invention, a block diagram schematic of an example sleep monitor 10 (also referred to as a monitor device in this disclosure) is shown including a computer processor (or simply a processor, or CPU) 12, a power supply 14, a Bluetooth/WIFI communication circuit 16, a memory 18. The monitor device can have an architecture of a general purpose computer, where different components can communicate through a system bus. As can be appreciated by those skilled in the art, processor 12 is connected to all components and controls the operation of each. Bluetooth/WIFI communication circuit 16 includes conventional communication circuitry to allow selective communication with Bluetooth and WIFI devices, including a Home Area Network 22, which in turn is connected to the Internet 24. The Bluetooth/WIFI communication circuit 16 includes the use of all types of wireless communication devices and techniques, such as, but not limited to Bluetooth, WIFI, and Zigbee. In addition, as illustrated in FIG. 1, a radar transducer 20 (e.g., a Doppler type) is shown. It is understood that other types of motion sensors may be used in place of a radar transducer, including, but not limited to SONAR (using sound waves to detect micro displacements), and LIDAR (wherein light is used to deter micro displacements) and IR sensors. The term "radar" and "radar transducer" is used hereinafter to include all types of motion detection and displacement measuring devices.

The diagram shown in FIG. 1 is only a non-limiting example of a "sleep monitor" or "monitor device" (or simply "monitor") as used in this disclosure. This disclosure contemplates any suitable "sleep monitor" or "monitor device" having any suitable number of any suitable components in any suitable arrangement. It is understood that a "sleep monitor" or "monitor device" can broadly encompass all monitoring devices or systems that can sense or monitor environment conditions (ambient temperature, humidity, sound, vibration, lighting, air quality, etc., of the environment in which the subject person is being monitored) as well as physiological and/or biomechanical signals from a human body (e.g., body movement, noise made by the person, body temperature, breathing, heartbeat, cardiogram, brain activity, etc.), by an either contact or non-contact manner. A monitor device can include all components and functionalities of a general smart phone (e.g., speaker, microphone, camera, GPS, accelerometer, etc.) as well as sensors and other components (e.g., radar/sonar related components) that are typically not included in a general smart phone. The software program of the present invention can be installed/loaded directly in the monitor device(s) to process information and data gathered by the sensors and other signal-acquisition components as well as other data entered by the user or retrieved from other sources. Alternatively, if the monitor device does not include the advanced chips/memory or other components of modern-day smartphones, the monitor device can be configured to work in concert with such a smartphone and utilize the components available on the smartphone (e.g., a microphone or other sensing devices), and in which case, the present software program can also be loaded on the smartphone which can be used to process information received from the monitor device. In some instances, the user's smart phone or other portable or wearable smart devices can be deemed standalone monitor devices.

In the sleep monitor or the monitor devices described herein, the processor can include one or more processors, which can include hardware for executing instructions, such as those making up a computer program or application, for example, it may retrieve (or fetch) the instructions from an internal register, an internal cache, memory, storage; decode and execute them; and then write one or more results to internal register, internal cache, memory, or storage. In particular embodiments, software executed by processor may include an operating system (OS). As an example and not by limitation, then the OS may be a mobile operating system, such as for example, Android, IOS, Windows. In some embodiments, the memory can include main memory for storing instructions for the processor to execute or data for processor to operate on. One or more buses may connect the processor with the memory. The memory can include random-access memory (RAM). This RAM may be volatile memory, where appropriate. Where appropriate, this RAM may be dynamic RAM (DRAM) or static RAM (SRAM). The monitor device can further include a permanent data storage device which can include non-volatile and/or non-transient mass storage or media for data or instructions, for example HDD, flash memory, optical medium, DVD, etc., or a combination of two or more thereof, solid-state memory, read-only memory (ROM), or any other suitable physical form. The communication component can include hardware, software, or both providing one or more interfaces for communication (such as, for example, packet-based communication) between the monitor device and other devices, for example, a network interface controller (NIC) or network adapter for communicating with an Ethernet or other wire-based network or a wireless NIC (WNIC), wireless adapter for communicating with a wireless network, such as for example a WI-FI network or modem for communicating with a cellular network, such as third generation mobile telecommunications (3G), or Long Term Evolution (LTE) network, wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more thereof. The bus can include hardware, software, or both coupling components of the personal computing device to each other, for example, a graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a serial advanced technology attachment (SATA) bus, a Video Electronics Standards Association local (VLB) bus, or another suitable bus or a combination of two or more of these.

As used herein, a system of the present invention can include one or more monitor devices described herein, wherein a memory is installed or stored which computer program product(s) (or software), which when activated or running (e.g., executed by the processor), enables the monitor device(s) to perform certain functions or methods according to the instructions of the computer program product. In some embodiments, when the software on a monitor device is activated (the details of which will be further described below), a user interface (UI), or graphical UI, may be loaded on a display area of the device so as to display information to a user and allow a user to interact with the software, e.g., through areas of a touchscreen designated in the computer software. The system can further include other devices that communicate with the monitor devices, e.g., a user smartphone, a remote server, a smart IOT device, a device designated to perform specific analysis (such as detection of certain chemicals), where the present software application product or components thereof can be installed to perform the functions contemplated, or data inputted or gathered by such devices can be sent to a monitor device or another device or server which may act as a nerve center to control or coordinate the functions of all involved devices. The functions and methods to be performed by the software product and the system are further described herein.

User System Profile:

According to one embodiment of the present invention, a user's observed habits, both during sleep and while awake, contribute to an internal system user profile. This profile is used to help customize recommendations specific to the user's individual needs regarding sleep. The system profile, according to the invention includes basic information and monitored-based information. The basic information may be inputted by the user, and includes user information such as age, gender, activity level (exercise), known sleep disorders, and allergies, known medical conditions and any medication being taken and diet.

The monitored-based and collected information is acquired by monitoring the user at various times throughout the day and night, using various types of devices and collecting data from various sources, preferably through wireless connection. During the day, such devices as a smart watch or personal activity monitor (e.g., a Fitbit device made by Fitbitof San Francisco, CA, or an Apple Watch made by Apple Inc. Cupertino, CA) may be accessed to receive specific and accurate heart-rate information, time, duration and intensity of user-activity, caloric expenditure and heart-rate recovery information. The user's portable smart device may be accessed (with permission by the user) to download calendar events, both business and personal, alarm clock information, email and social-media activity. Internet connections allow for the download of other useful information, such as weather, geopolitical news and events, stock-market activity, etc.

When the user is asleep, various parameters of the sleep can be measured, such as detection of sleep stage and duration, sleep cycle duration and number, number of interruptions, snoring, teeth-grinding, and any indication of sleep-apnea events. An example sleep-monitoring system can include a radar-based monitor.

Each collected factor or piece of information of a user may be given a weight when considered in diagnosing sleep behavior of the user and calculating a user's "sleep score", or predicting a user's future sleep score. How a factor is considered may be based on the user's age or gender, for example, or other considerations. When predicting a future sleep score value for a user, the variables in the calculation may be adjusted or fine-tuned over time to yield the most accurate result. The adjustments may be based on actual sleep scores compared to predicted values. In this manner, future predictions become more accurate. For example, it has been determined over time that for a particular user the amount of exercise the user does not affect the user's predicted sleep score value, the weighting for the exercise factor decreases (has less influence) when calculating a sleep score, in this example. Continuing with this example, if air quality appears to have a high effect on the user's sleep score, this factor will increase in importance.

Bedtime Guide:

According to some embodiments of the present invention, upon waking to a new day, the present system generates a prescribed ideal bedtime for each individual user. The bedtime is estimated based on specific factors including quality and duration of previous night's sleep, previous night's sleep score, sleep scores and other factors measured on the particular day of the week in the past (such as previous Mondays), expected activity of the user during the day, general health status and other measurable factors that can influence sleep and be tracked by sensors in a device or through input received directly from a user.

The present system will follow an ideal day model, wherein a bedtime is provided to a user with the assumption that the user will follow an expected path and provides the user with milestones that must be met (e.g., the user eats a certain amount of food or a certain type, a certain amount of exercise, and perhaps no more than a certain amount of caffeine). The projected bedtime can shift depending on the actions of the user throughout the day and how close the user follows the regimen. By way of example, when a user first awakes, the system reveals that his target bedtime is 11:30 pm that day.

However, suppose the user experiences a rough day with poor eating habits and finds out that he will have a busy morning the following day. Due to these actions and upcoming events, at noon, the system recalculates the prescribed bedtime to 10:15 pm. Continuing with this example, after a restful second half of the day without any caffeine consumed and a cancelled morning meeting the next day, the user's prescribed bedtime (by the present system) is again shifted at 6 μm to 11 pm.

Figure 2:
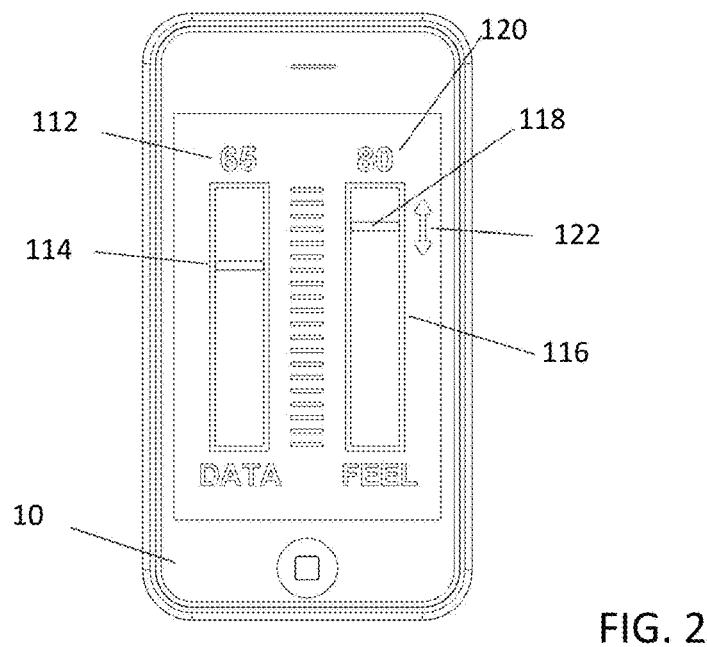
FIG. 2 is a plan view of a user interface on an exemplary smartphone, showing details of an interactive graphic representing "DATA" and "FEEL" values for a select user, according to certain embodiments of the present invention.

Referring to FIG. 2, an initial assessment of perceived sleep quality for the previous night is calculated by the present system, based on data and certain assumptions and estimates. This value 112 is displayed on a monitor device 10 (illustrated as a user's smartphone with a touchscreen display) as a numerical value (shown as "65" in the example shown FIG. 2) and also as a bar-graph representation 114, shown just below the number value and labeled "DATA". The "DATA" assessment of the user's sleep is illustrated on the left side of the user's smartphone display. On the right side of the user's display is another bar graph 16 which is labeled "FEEL." The "bar" 118 of graph 16 may be moved up or down by the user and a corresponding representative numerical value 120 (the number "80" is shown in the figure) is displayed above the graph. Bar graph 116, according to this embodiment of the invention, may be changed by the user simply by sliding the bar 18 up or down, illustrated by arrows 122. This allows the user to input how he or she felt about his or her sleep. The user is asked to provide their own assessment of a sleep score for the previous night (based on a scale between 1 and 100, for example). The system may then compare the user's value with the system's value. If the two values differ beyond a predetermined threshold margin, then the collected information of the previous day can be flagged for further review. The present system allows the user to provide their own sleep score. The illustration shown in FIG. 2 is just one example. There are many other ways to do this using appropriate graphic user interface (GUI), but it is desired that the input system is simple and intuitive, such as a user-interactive bar graph version shown in FIG. 2 (e.g., dragging the bar of the bar graph up or down by touching the touchscreen of the user's smart device-GUI). The system's sleep score value may be offered on the same or different graph in a clear and understandable manner, as is understood by those skilled in the art.

As used herein, an electronic device user interface includes a typical graphic user interface of an electronic device (e.g., a monitor device, smart phone, or other smart devices) which displays visual information to the user, as well as other ways to communicate to the user, such as vibration, audio, light and other signals that can be perceived by the user.

In some embodiments of the present invention, a "full night" sleep score is provided by the system for a user's entire sleep for a particular night's sleep. Furthermore, an interval sleep score is also provided for each determined sleep cycle, and possibly for each determined stage of sleep (N1-N4). The interval sleep scores will be time-stamped and may include other information, such as the user's heart rate, room temperature (and other environmental conditions), and any recorded sounds. This information will allow the user to better understand the quality of his other sleep and also what factors may be disrupting his or her sleep.

The present system allows a user to review previous day scoring versus previous night's sleep quality if the predicted correlation between sleep preparedness in the day and resulting quality of sleep during the night appears inaccurate, then the previous day's activities will be tagged and monitored to identify trends and reasons for differences. Does the user have an already measured baseline reaction to these events as it pertains to sleep or should monitoring begin to establish one? If the user discovers days wherein the present system predicts a good sleep, and the user doesn't sleep well, and the previous day always includes kickboxing, the system would advise the user to skip kickboxing on a similar future day to test if sleep quality improves that night. If the sleep does improve, then the user and the system would know that kickboxing is a factor that must be carefully considered when evaluating sleep quality.

Receiving Data

The present system and/or device is configured or adapted to receive information from various sources throughout a day and night, including the user inputting known data (and confirming data), and automatically uploading data from electronic devices (e.g., sensors).

The monitored-based and collected information can be acquired by monitoring the user at various times throughout the day and night, using various types of devices and collecting data from various sources, preferably through wireless connection. During the day, such devices a personal activity monitor (e.g., a "Fitbit device made by Fitbitof San Francisco, CA) may be accessed to receive specific and accurate heart-rate information, time, duration and intensity of user-activity, caloric expenditure and heart-rate recovery information. The user's portable smart device may be accessed (with permission by the user) to download calendar events, both business and personal, alarm clock information, email and social-media activity. Internet connections allow for the download of other useful information, such as weather, geopolitical news and events, stock-market activity, etc.

When the user is asleep, various information can be measured, such as detection of sleep stage and duration, sleep cycle duration and number, number of interruptions, snoring, teeth-grinding, and any indication of sleep-apnea events.

Figure 3:
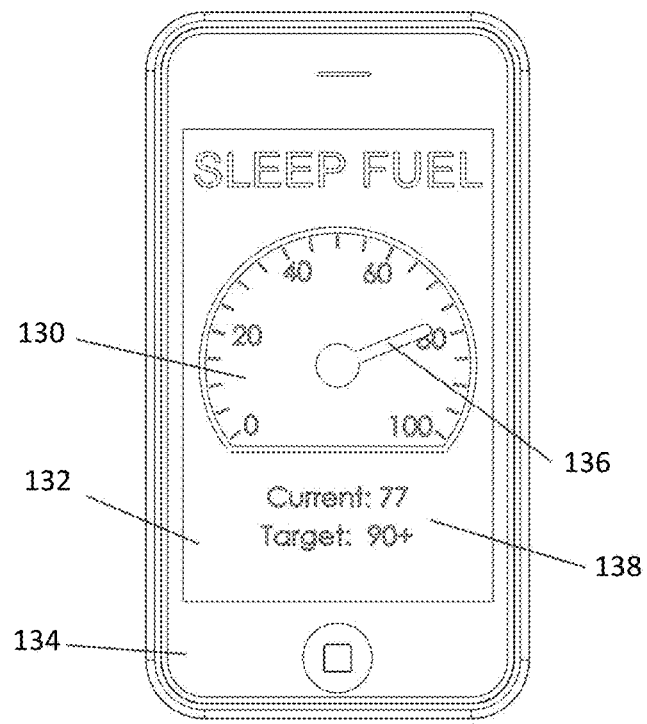
FIG. 3 is a plan view of a user interface on an exemplary smartphone, showing details of an interactive graphic representing "Sleep Fuel," according to certain embodiments of the present invention.

Referring now to FIG. 3, a "sleep fuel" gauge graphic 130 may be provided on display 132 of a monitor device or a user's smartphone 134 (the term "smartphone" in this application is used to generally represent all portable smart devices, as well as personal computers, laptops and smart watches).

The GUI gauge graphic 130 indicates the amount of sleep fuel (or sleep credits) the user has earned through his or her actions throughout the day. Specific actions (or absence of certain action) will affect a user's sleep quality—good or bad. Depending on what the user does throughout the day, the gauge needle 136 will move to "add fuel" or "remove fuel" (following the fuel analogy), like the gas gauge of a car. Good habits and actions which benefit sleep are called "sleep-helpers" and will increase or hold the "amount" of sleep fuel shown on gauge 130. This means that the user will likely enjoy good quality sleep if he or she does things that are considered sleep-helpers throughout the day and early evening. In contrast, bad habits and actions that are known to adversely affect sleep quality are called "sleep-killers and will decrease the amount of sleep fuel shown on gauge 130, indicated that a quality sleep is threatened. In one embodiment, the system can automatically detect or otherwise determine the actions and decisions of the user throughout his or her day so that a sleep gauge value may be calculated and displayed. Good or bad decisions could result in "Sleep Fuel" gained or lost. The gauge fills or empties throughout a day to signal how prepared a user is for their best sleep during the coming night.

A numerical "Current" sleep fuel reading and a "Target" reading (138) are provided to help the user quickly understand important values.

Recorded actions by the user are qualified as either helpful or harmful to the user's upcoming sleep in real time and are given associated scores in various categories, such as food, smoking, exercise activity and levels, etc. Qualifying helpful actions are further grouped in a "Sleep-helpers" category while harmful actions are placed in a "Sleep-killers" category. A dynamic list of trackable actions and consumed items that influence sleep, good or bad is provided to the user. The user is encouraged to follow the list with an effort to improve his or her sleep fuel score. Generic assumptions around these activities and consumed items will evolve with time and best understood science. The "score" of each action and consumed item will ideally adapt to the user's specific data over time (each person's sleep is affected by different things in varying degrees).

According to this embodiment of the present invention, a user's routine activities and decisions made throughout a day will be monitored and scored (e.g., by one or more wearable smart devices), with a weighted multiplier, if appropriate, according to the particular activity, the user's profile and the user's activity-score history (e.g., how the particular activity affect the user's sleep in the past). The present system keeps track of the sleep-fuel score, as it changes throughout the day.

According to this embodiment, the user may start the day with a "perfect" sleep-fuel score. This score is reduced (by prescribed amounts) whenever the user makes poor, sleep-killer decisions during the day. Any lost points through such actions may be regained or restored if the user mitigates or otherwise negates the sleep-killer activities and/or decisions with sleep-helper ones. This process allows the user to better identify and address sleep-killer activities and decisions and work to correct or overcome them.

For example, a user starts his day with a sleep-fuel score of 77 (this score may not be 100 for everyone due to other factors—some people may have a max sleep-fuel score that is less than 100). In this example, the present system knows that the user is overweight and does not regularly exercise and therefore will always have trouble with his sleep. The sleep fuel score of 77 is displayed on the user's smartphone 34 when he first wakes up from bed. The user decides to have a healthy breakfast and walk to work. The present system will monitor his physical activities by accessing the user's activity monitor (in this case, a FitBit device worn by the user). The present system will respond to the detected activity with a gain of 5 points to the user's sleep-fuel score and the new score of 82 is now displayed on his phone. Later in the day, he learns that he will be taking on a lot more work due in two days and decides to relax a bit by smoking a few cigarettes after lunch. Although the present system may not be able to readily detect smoking intake outside, or the amount of work the user is given, the present system follows a software application which runs on the user's smartphone, which includes features that ask the user to input information from a list. Understanding that the present system is not an "enemy," but a means for the user to maintain good health through good sleep, the user will be honest and check the appropriate boxes provided by the application, such as:

A) Smoking:

| a) | Did you smoke today? | Yes |
|---|---|---|
| b) | If so, how many cigarettes? | Two |
| c) | At what time? | 1:00pm |

B) Work-Load:

| a) | What is the current level of workload today? | Level 6 |
|---|---|---|
| b) | What is the current level of workload this week? | Level 5 |
| c) | Do you have any work deadlines tomorrow? | Yes |

C) Drinking:

| a) | Did you consume any caffeinated drinks today? | Yes |
|---|---|---|
| b) | If yes, at what time? | 9:00am |
| c) | Any alcohol? | No |

D) Exercise:

| a) | Did you exercise today? | Yes |
|---|---|---|
| b) | If Yes, how many minutes? | 30 minutes |
| c) | What type of exercise? | High impact (Running) |

The present software application program preferably provides a user-friendly GUI with appropriate icons, such as a martini glass for "alcoholic drinks" and a cigarette with smoke to represent "smoking." The user would simply have to depress the appropriate icon to quickly focus on a desired category and input data. The program preferably offers a voice-recognition feature to allow the user to input information just by using his or her voice.

In some embodiments of the present invention, the user may start his or her day with a sleep fuel score of zero, wherein the user must work his or her way up to a good sleep-fuel score by bedtime. The score displayed on his or her smartphone is still dynamic and may move up and down, depending on the types of decisions and activities the user makes during the day.

In either method, cognitive tests could be issued using the present software program during the day to challenge any assumptions the present system makes regarding any detected or monitored activity and to fine-tune the current sleep-fuel score. These scored actions can include things like measuring basic milestones hit (meals, exercise, rest periods, etc.) that contribute to putting user in best condition for sleep.

Scoring decisions start with a baseline algorithm based on data obtained from an observed community (i.e., other users) and also the best available scientific data. The present algorithm preferably adapts to user-specific impact overtime. For example, a user who is comfortable staying up late (i.e., a "night owl") may thrive on late night work periods and would worry about maintaining work efficiency if the present algorithm recommends that the user go to bed early. In such instance, the algorithm would change to accommodate this user's late night routine and not try to change the user's habits.

If a user does not follow a particular recommendation by the present system, for better or worse, the present system may inquire through the user's smartphone, for example, why he or she deviated from what was recommended. Based on the user's response, the system may adjust to accommodate the changes that the user apparently prefers, or disregard the irregularity as an "outlier," or a one-time event.

The present system can actively identify if and why certain recommendations are not successful. For example, the present system can recommend an ideal bedtime of 10:00 μm to a user, but the user finds himself laying restless in bed. If, in this example, the user starts using his iPad or smartphone, since he can't sleep anyway, the present system detects this action and immediately displays a prompt on the user's smart device which encourages the user to open the present software program. The program will then initiate simple questions to try to understand why the user cannot sleep. It is important that the present software program not be intrusive or annoying when interacting with the user, especially when the user may be a bit tired, but just cannot sleep. The interaction shouldn't cause the user to think to hard or become more "awake". The proposed questions should be simple and easy to respond to (yes/no, 1-5). The system could also end this interaction with options for additional therapy to aid sleep, such as an audible counting-sheep game, or conventional soothing nature sounds, or appropriate music which, according to the invention, fade in volume as the present system detects that the user is falling asleep.

According to the present disclosure, any sleep-related scoring of a user may be revised if a user inadvertently, or deliberately acts on a high-level sleep-killer activity within a prescribed time period before a recommended bedtime. For example, if a user drinks 4 cups of cold brew coffee just 30 minutes prior to the recommended bedtime, the resulting caffeine loading will adversely affect the user's sleep quality and ability to fall asleep. In such instance, the present system will record the event, recalculate a new bedtime for the present evening and following evenings, and attempt to instruct the user to carryout sleep-helping activities immediately. Of course, if the user consumed the same coffee 12 hours prior to the recommended bedtime, the present system would not give this action the same weight for change, and would not have to change the present bedtime.

The present system may be connected to, receive signals and/or communicate with a variety of electronic devices, as mentioned above, including medical devices, such as heart rate monitors, blood pressure monitors, and blood glucose monitors. The present system may also be a part of or embedded in one or more of these monitoring devices, and/or a separate monitoring device (which includes a smart phone). The present system may analyze received medical-related information and notify the user, and following agreed upon instructions, remind the user to take any required medication to help address the causes of any abnormal readings from any of the connected monitors. If a user's blood glucose levels are abnormal, the user is reminded to take his or her medicine and, if necessary, suggest a type of food or exercise that may help control the abnormal level so that the user may sleep better that night. For example, the present system may indicate to the user that: "A slice of toast and jam 30 minutes before dinner might spike your glucose," "Try a banana for a better night's sleep," etc.

According to the invention, and as mentioned above, the present system may also interrogate specific world, national, and/or local news agencies for recent news. News events which are tagged, or determined to be as stressful, scary, exciting or otherwise dangerous (by recognizing keywords, such as "died," "killed," "fire," "destroyed," and "lost" may influence all users, or only certain users based on certain considerations, such as gender, age, career, and residence. According to the invention, news articles can help inform the present system, and the system can react with therapeutic suggestions to take specific action to calm or distract, such as "perhaps you shouldn't watch any news after 7 pm."

When using the present software program, the user can always self-report a variety of information regarding his or her decisions throughout the day and night. Such things as food/beverage intake, exercise, stress events, etc. The user can provide the present system a self assessment, such as: "I feel great right now" and the present software program can analyze recently reported and sensed data, device activity, etc. to determine what might be influencing the mood of a user for the better and flag the details of the moment for later analysis. Such mood enhancing may affect the user's sleep quality and allows the system to revise the numerical rating of the particular activity. The user can also suggest exactly what they think is helping them "feel great" to auto tag for system review. For example, "I just swam for an hour and I feel great." "Also, I ate a salad and I feel great." "That taco I ate at noon, not so good."

Advice Delivery:

The present system will provide advice to a user regarding how to improve sleep quality (increase the user's sleep score). The user uses his or her smartphone to provide a schedule for receiving such advice throughout the day and evening and the present system will offer such advice at those times. The present system preferably uses at least one, and possibly an array of connected sensors (such as the user's portable activity monitor—e.g., a FitBit), user interaction and assumptions to determine if the user has followed relevant advice.

Certain times of a user's day will be identified as most effective for advice delivery. For example, a scheduled time in the morning to educate the user on coming day and points of focus. A scheduled time in the afternoon to get the user to act on his or her own behalf, a twilight time to correct poor decisions or reinforce great decisions that the use made at a point during the day and an evening time to help the user wind down and prepare for sleep.

The present system can be adapted to link with wearable sensors for detecting movements and sounds, etc. that are associated with sleep-killer activities and immediately warn the user against such action and suggest alternative actions or a more appropriate time for the user's desired action. For example, the system detects that the user has started to exercise at 10:00 pm, very close to bedtime. The system will push a notification to the user's smartphone and advise the user not to exercise at this late hour and suggest an alternative activity, such as slow stretching instead. The system will then indicate to the user, in this example, that a reminder will be set for tomorrow morning for exercise.

After a period of time, the system will begin to learn the user's daily regimen regarding diet, work, entertainment, social and physical activity, and personality and use this information to categorize the user. This categorization is then used to compare other users within the same category. Sleep-related trends, problems, and advice can then be more accurately and readily generated.

In some embodiments of the present invention, the present system predicts a user's sleep-score for the upcoming night based on the user's readiness for sleep and other factors. If a user has a great day and surpasses milestones set by the system, by following, for example, the requisite intensity of exercise at the recommended time and by avoiding coffee late in the day, etc. the user would potentially accumulate sleep-fuel over the expected maximum amount. In such instance, the user can use the excess as credit and apply the credit to certain things, such as selecting a slightly later bedtime without an adverse impact on predicted sleep quality.

If a user wishes to ignore a bedtime prescribed by the present system and stay up late, the present system will immediately communicate to the user (e.g., through the user's smartphone or other smart devices) and explain (through text, spoken voice, or graphics) to the user how staying up late will change the user's sleep score in real time, for both the immediate night's sleep, and even the following night's sleep. In this instance, as the user stays up past his or her prescribed bedtime, the present system will cause the user's smartphone to display the user's current sleep-score in real time. The later the user stays up, the lower the sleep-score displayed on the user's phone. The present software program can also cause the user's smartphone to add sound effects to the countdown of the user's sleep-score to emphasize the importance of staying up past the prescribed bedtime. The user will be actively "pushed" (notified) on his or her smartphone at regular intervals.

A user of the present system can purposely decide to surpass a prescribed bedtime. In some embodiments of the present invention, the present system will warn the user, ahead of time, of the consequence on his or her sleep quality. In such instance, the user can ask the present system, either verbally using speech recognition software, or though text input using the GUI of the user's smartphone how staying up a certain time doing a certain activity will affect his or her sleep score and sleep quality.

For example, the user may have a bedtime of 11:00 μm and at 10:55 pm, the user opens the present software program from his smartphone and types in the following question: "How will watching TV until 11:30 affect my sleep tonight?" The system will analyze the question and calculate a response, based on the user's stored information and sleep history. In this example, the system may respond: "Doing this activity, your sleep-score will be reduced from 97 to 85 and will change your bedtime for tomorrow night, as well").

The present system and software application can provide a friendly user interface which is conversational to the human user and, continuing with the above example, may suggest to the user that he or she listens to music, instead of watching TV. If the user agrees, the present software program can then query available databases to find appropriate music that will minimize the user's change in sleep-score. This would include factors such as, duration, genre, volume, tone, and beats per minute.

Furthermore, should the user insist on watching TV, the present software program can inquire the specific show to fine tune the impact on sleep. For example, if the show that the user wants to watch is "Game of Thrones" and it is an hour long, the present system can quickly research details of the show (even specific details of the episode) and respond to the user: "Game of Thrones is 1 hour long and is listed as action, drama and rated as violent." "The duration and excitement level is expected to change your sleep-score from 97 to 63." The present system would strongly recommend listening to music instead of watching this show.

The present system may adjust the "tone" of the communication to the user depending on the level of change of the user's sleep score. For example, if watching the Game of Thrones will cause the user's sleep score to plummet from 97 to 63, the tone of communication between the present software program and the user will be strong-using bold, flashing text of larger font, and sounds. If electronic voice is used as the form of communication, in this instance, the voice will be made to sound stern and curt.

The present system can be more effective if context is considered when evaluating a user's activities. For example, if the following day is a Sunday, and the user's only scheduled event is an outdoor BBQ, the system will be more lenient if the user asks to "break the rules," since lowering the user's sleep score in such instance, can be easily recovered the following day. However, the present system can be stricter if the day in question is a Tuesday and the system understands that the user has an important meeting the following day.

According to the present invention, the present system can be adapted to link a user to strategic partner-services that may be more sleep-friendly than watching television late at night, for example. If a user asks the present system permission, in effect, to watch television for another 30 minutes, the present system can suggest to the user that a more sleep-friendly alternative would be to listen to one of these five playlists by Spotify, or Pandora, etc. If, in this example, the user agrees, the present system would automatically load the playlists onto the user's smartphone (or other connected sound system) and dynamically control the volume and play, as the user falls asleep.

For example, the present system begins to play music from a selected playlist on Spotify at a first volume selected by the user. The present system will preferably restrict the maximum volume that the user may select (to prevent the sound from lowering the sleep score, on its own).

As the user rests in bed, listening to the selected music, the present system detects this and slowly lowers the volume automatically until the user finally falls asleep, at which point the present system turns the music player off. The present system can use sensors to determine if the user is asleep, or entering the first stages of sleep. If the system determines that the user is not sleeping or is remaining awake, the system can automatically change the playlist to play a softer, more sleep-inviting music.

Potential Sleep Disruptors: Your Bed Partner:

Two-thirds of U.S. adults report that they regularly sleep with a partner. Yet, through 60 years or so of sleep research, scientists have tended to view sleep as an individual behavior, largely ignoring the potential impact of bedmates. Two or more sleep partners using the present system can certainly affect each other's sleep quality regardless of assumed individual sleep preparedness. For example, each person of a two partner relationship can do all the right things throughout the day and evening to maintain a high sleep-score, and yet, if a first of the two partners happens to move around a bit, lingering in light sleep stages for a while longer than his or her partner, or snores, then the other person may have a hard time falling asleep. For at least this reason, and in some embodiments of the present invention, a shared sleep-score is a beneficial measurement to determine to overcome help understand and control shared factors that could influence group sleep. These include snoring, bruxism, tossing and turning, unconscious noise, and odor generation. The term group sleep applies to a couple, or an entire family, even if some members sleep in different rooms.

According to the present invention, whenever a couple (or group) using the present system sleeps together, it is desirable to establish a baseline for each individual, meaning that each person in the group should allow the present system to evaluate their sleep when they sleep alone in their own bed for a prescribed period of time. By doing this, the present system will be better suited to determine causes of sleep discomfort to any one individual of a group when they sleep as a group. The present system is adapted to monitor a user's sleep, when sleeping as a group and correlate any sleep problems the user encounters during sleep with activity from the sleep partner, in his or her bed, or perhaps another person sleeping in another part of the house.

According to the invention, the present system monitors all people of a sleep group and evaluates each person so that a "problem sleeper" (that is a person who is restless or moves around or snores, etc.) is given a later bedtime than other people in the group.

This allows "good sleepers" in the group to be able to fall into a deep sleep, before the problem-sleepers enter the bed. Hopefully, the good sleeper will reach a deep sleep before the "problems" of the problem sleeper have a chance to awaken or otherwise disturb the good sleeper. For example, a person of a sleeping group may have issue falling asleep while his or her partner snores. In this case, as long as this person is already asleep (and potentially in a specific phase of deep sleep) he or she may not be affected (or at least less so) by the snoring noise of the partner. As another example, a "good sleeper" consistently requires about 30 minutes to reach a stage of sleep wherein he or she will not be easily aroused. The present system will know this and use this information to calculate the bedtime of the problem sleeper so that he or she will be less likely to disrupt the good sleeper's sleep. This arrangement will likely require acknowledgement during the day that each person in the sleeping group agrees to follow recommended bedtimes without deviation or argument. In this manner, the present system is able to handle otherwise difficult decision making for group sleepers based on system and monitored data.

In such situations wherein a parent, for example, must wake up during sleep to tend to a baby's needs (crying, diaper change, feeding, etc.), the present system may determine which parent of the two is, at the moment of disruption, more prepared to wake up. For example, the system may monitor each user in bed and follow which sleep stage each person is in, during their individual sleep cycles. The present system can use this information to help the parents decide which of the two should wake up, at the particular moment, to tend to the baby, or tend to other things as necessary.

Other factors may be considered by the system in determining which partner should wake up in the middle of the night to attend to a disruption (e.g., baby crying), such as time remaining until scheduled wake time for each user, occupation, overall health, age, gender, and next day's agenda. For example, if a first person of a sleeping couple has a busier day to wake up to, but that person's day will start later than that of the second person, the present system will determine that the first person wakes up to take care of the baby.

Similarly, any early morning chore could also be assigned by the present system to whomever is best equipped to wake at that moment.

The system will rely on past history of each user regarding how well each is able to wake up from each stage of sleep and how easily it is for each user to recover their sleep cycle and return to sleep, after waking up.

In some embodiments of the present invention, the present system can also decide if a user requires additional sleep at a given moment or if the user can be awakened to safely engage in a particular pre-scheduled early activity, such as exercise. The present system will know that the user exercises each morning, but if it is determined that the user has not enjoyed sufficient sleep, and perhaps was restless or disturbed throughout the night, the user will be informed not to engage in the morning exercise until a later time, and that the user should remain sleeping for a predetermined amount of time, user's schedule permitting. How the present system weighs each activity based on the measured duration and quality of a user's sleep may vary depending on the importance and type of each activity and other factors, such as day of the week.

Methods of Measuring Sleep

Figure 4:
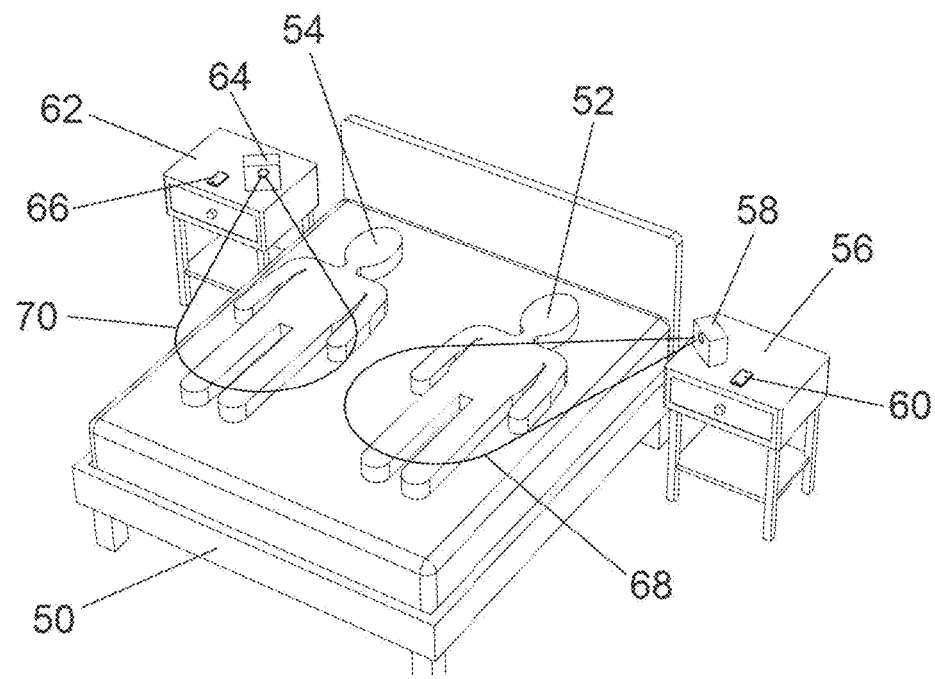
FIG. 4 is a schematic view of a bed, showing two users, two radar/sonar based monitor devices, and two smartphones, according to certain embodiments of the present invention.

Referring now to FIG. 4, a bed 50 is shown with a primary person 52 sleeping on the right hand side and a secondary person 54 sleeping on the left hand side. A right hand side table 56 supports a right monitor device 58 and a right smartphone 60. Similarly, a left hand side table 62 supports a left monitor device 64 and a left smartphone 66. In the example illustrated in FIG. 4, right monitor device 58 selectively can transmit either radio frequencies (RF) or sound frequencies in an area of reception 68, and left monitor device 64 can selectively transmits radio frequencies (RF) or sound frequencies, in an area of reception 70.

It is generally known to use a radar device positioned adjacent a user's bed 50 to help measure specific movements of a primary user 52 as the user sleeps. By transmitting Doppler radar towards a user within a prescribed area of reception 68 and receiving the reflected return signals, monitor device 58 can accurately detect minute movements (to a mm range) of user 52 as he or she sleeps. The signals of the small movements can be analyzed by a computing component onboard of the monitor device (e.g., a microprocessor and memory associated with it) or sent to another computing device to detect specific signatures which are indicative of certain sleeping conditions, such as restlessness, sleep-apnea, snoring, and can even be used to determine which sleep stage of a sleep cycle a user is currently in. As mentioned above, sonar (or the transmission and reception of sound waves propagating through a medium, usually water, but this case, air, at acoustic frequencies ranging from infrasonic to ultrasonic) may also be used wherein the sonar system may use microphone and the speaker onboard of the monitor device or those provided by the user's smartphone 60, 66, or separate microphones and speakers. The monitor device or user's smartphone (positioned next to the bed) can be configured to transmit a specific sound pattern at a specific frequency (preferably just beyond the range of human hearing, such as 20 Hz). The microphone can be configured to sense (and the phone to record) the first acoustic signal in a frequency range associated with a sound and/or a motion made by the subject, and a second acoustic signal in a frequency range associated with the reflection of the transmitted sound pattern transmitted by the speaker. Examples of sonar-based systems are disclosed in WIPO patent publication No. WO2017167731A1 as well as U.S. Patent Application Publication No. 20200297273, the contents of which are hereby incorporated by reference in its entirety.

Monitor device 58 can also be used to measure a user's breathing rate, heart rate, and muscle twitching. An example of a radar device system is shown in U.S. Pat. No. 8,562,526 of Heneghan et al. entitled "Apparatus, System, and Method for Monitoring Physiological Signs," the content of which is hereby incorporated by reference in its entirety. The contents of the below patent references are also incorporated herein by reference in their entireties:

PCT/US2015/053288, entitled: "Systems and Methods of Identifying Motion of a Subject"

WO2018050913, entitled: "Apparatus, System, and Method for Detecting Physiological Movement from Audio and Multimodal Signals"

U.S. Pat. No. 6,426,716, entitled: "Modulated Pulse Doppler Sensor"

U.S. Pat. No. 7,952,515, entitled: "Range Gated Holographic Radar"

U.S. Pat. No. 7,994,968, entitled: "RF Magnitude Sampler for Holographic Radar"

Although the above described monitor device 58 works well when monitoring a single primary person 52 in bed 50, difficulties may arise when using such a device 58 to monitor a single sleeping primary user 52 who is sleeping next to a secondary person 54 in the same bed 50. One problem is in positioning the device to only read the intended primary user 62, that is, the one closest to monitor device 58, as shown in FIG. 4. For example, if the intended primary user 52 is sleeping quietly, monitor device 58 can capture her faint signals reflected off her body, indicative of her respiration movements. However, continuing with this example, if secondary sleeper 54 is having trouble sleeping, perhaps because he is in a different stage of sleep, or has other issues and moves around in bed a lot, his movements will also be picked up by right hand side monitor device 58, even though device 58 may be positioned closer to his partner. Large movements will create strong RF return signals. These large signals from secondary person 54 will interfere and effectively drown out the relatively faint respiration signals reflected from the intended primary user 58, rendering the monitoring data useless, or at least less accurate.

To help overcome the above-described signal interference problem, and according to an embodiment of the present invention, the present system can include and utilize information about the primary user's partner (secondary user 54), during setup, including when he or she goes to bed. If the partner's bedtime is such that the sleep cycles of the main user and the partner are "out of phase," then the present system may use this information to only activate right hand side monitor device 58 when it is likely that secondary user 54 is engaged in Stage 3 sleep or Stage 4 sleep, wherein the secondary user 54 does not move much in bed. During this time, the present system would active the right hand side monitor device 58 and begin recording reflected signals off the primary user 52, with confidence that the received data would likely be accurate.

The present system can also use other ways to confirm that the signals received are for the intended person. For example, the system can utilize the primary user's smartphone 60 positioned immediately adjacent the primary user 52 on the right side table 56 to help identify and confirm that the signals received by the monitor device 58 are indeed from primary user 52 and not from his or her partner (secondary user 54) lying on the opposite side of bed 50. As discussed above, the monitor device can include all components and functionalities of a general smart phone as well as sensors and other components (e.g., radar/sonar related components) that are typically not included in a general smart phone. In this case, the present software program can be installed/loaded directly in the monitor device(s) to process information and data gathered by the sensors and other signal-acquisition components as well as other data entered by the user or retrieved from other sources. Alternatively, if the monitor device does not include the advanced chips/memory or other components of modern-day smartphones, the monitor device can be configured to work in concert with such a smartphone and utilize the components available on the smartphone (e.g., a microphone or other sensing devices), and in which case, the present software program can also be loaded on the smartphone which can be used to process information received from the monitor device. In an example, the microphone of the primary user's smartphone 60 is automatically activated at prescribed times (by the present software program) during monitoring (or continuously), or, as preferred, only when the monitor device 58 is activated. During the monitoring times, the system will receive both reflected radar signals, to indicate movement of the primary user, and audio signals from the room. The present system can align the signals by time and correlate recorded movement signals with recorded sound signals. Since the primary user's smartphone 60 is positioned closer to primary user 52 than it is to his or her partner (secondary user 54), sounds from primary user 52 will likely be louder than other sounds in the room. The present system will be able to recognize movement signatures, such as light respiration movement of the user's chest, with the synchronized breathing sounds by the primary user 52 and use this information to increase the confidence that the system is indeed monitoring primary user 52 and not secondary user 54, the partner sleeping nearby.

Furthermore, if a separate audio signal is not captured, and in the case where only a single monitor device 58 is used at one side of bed 50, the collected data can be later analyzed with assumptions that stronger radar signals are likely those returned from the closer sleeper 52 and weaker signals from the more distant sleeper 54. This will allow the present system to determine which signals are from whom.

Referring again to FIG. 4, there are instances wherein two monitor devices 58, 64 will be actively monitoring two separate people 52, 54 in the same bed 50 (or room). The two radar signals 68, 70 from the two monitor devices 58, 64 would normally interfere with each other and effectively mitigate the accuracy of the data collected from each device. Tracking the sleep of two users 52, 54, each with a monitor device 58, 64 located on each side of the bed 56, 62 can be accomplished, according to the present invention, but with sensor management. For example, the two monitor devices 58, 64 can be synched together so that the devices alternately transmit radar in such a way that the radar signals avoid interfering with each other. In other words, the devices are timed so that only one device is transmitting at any given time.

In some embodiments, each monitor device 58, 64 used in a room automatically identifies each other, using, for example, a BLE beacon, or WIFI, or other types of wireless or even a hardwired system. For example, two monitor devices 58, 64 can transmit a BLE beacon signal and also listen to nearby beacons transmissions. If a beacon signal is detected, the present system calculates a reasonably accurate range estimate (within maybe 5 feet) so that the system will at least learn that another monitor device is operating in the same room (and not a neighboring bedroom).

Acoustic signals can be used to determine whether two monitor devices 58, 64 are operating in the same room. This is particularly useful since sounds do not penetrate the walls of a house as well as do RF signals.

When two users are quietly asleep in a common bed, the RF signals from their respective monitor device 58, 64 can be very small, since a sleeping user 52, 54 will only have slow respiration movement of their chest, and likely very little other movement. However, if one of the two users 52, 54 enters a sleep stage wherein that user is likely to move about and perhaps roll over, that person's Doppler signal will be huge, compared to the signal of the adjacent, still-sleeping user. The huge signal due to one person moving will effectively drown out the sleeping partner's small respiration signal.

If two monitor devices 58, 64 are operating in the same room, a first one can be turned on, while the other monitor device is activated to pulse its transmitting radar on and off at a prescribed frequency, such as 10 Hz. The present system can then use this information to determine the interference signature, constant interference with a growing and fading pulse (at 10 Hz, in this example). The system can then use this information to predict the level of interference during monitoring and thereby also calculate a percentage of accuracy. The process may be outlined as follows:

a) Device A (58) begins pulsing Doppler radar at 10 Hz.
b) Device B (64) measures the received pulsed signal and determines if its own readings are shifted up or down in amplitude as a result of the neighboring device.
c) The process is repeated by reversing the functions of Device A and B (the results should confirm interference).
d) The system can inform the user of any interference issue, and the magnitude of the problem ("your sleep measurement resolution is at 50%").
e) The system guides the user to reposition each monitor device 58, 64 to help mitigate future interference.

It is further contemplated that for each monitor device 58, 64, a focused beam of light can be provided that matches the prescribed area of reception 68, 70 so that the user may easily understand the area that the radar operates. The beam of light is meant to be activated when positioning the monitor device 58, 64, but the light may be turned on by the user at any time to function as a night light or a reading light. The field of view of the light can be the same as the field of view of the invisible radar field. In this arrangement, if two or more monitor devices 58, 64 are used nearby, the users may be instructed to position each device so that the now visible field of view of each respective radar field does not cross other radar fields and that each field covers the respective user's body. The beam of light can be colored to not affect a user's sleep quality and may be further dimmed or brightened to help a user fall asleep and be awakened as desired, a kind of illuminating alarm clock.

In a different example, a disturbance-measuring (DM) device can be used to determine how much potential disturbance a sleeping partner inflicts on a sleeping user during a sleeping period (though the night). In some examples, the DM device does not need to be a stand-alone device, but can be regarded as a component for receiving and transmitting input signals to a main monitor device, via an API and/or wired or wireless connection. In other examples, the DM device can be small, self-contained and self-powered with an appropriate internal battery, and can further include Bluetooth wireless communication circuit, microprocessor, electronic memory, and sensors (such as thermometers, accelerometer, light sensor, microphone, speaker, etc.) The DM device can be linked to a user's smartphone, or the user's sleep monitor via a Bluetooth communication link. Alternatively, the DM device does not need to be a stand-alone device, but can be regarded as a component for receiving and transmitting input signals to a main monitor device, via an API and/or wired or wireless connection. The DM device can be positioned next to the user's sleeping partner, as the partner sleeps. The sensors of the DM device can record various measurements and the processor will store the measurements, along with time and date information on the local memory. The DM device can upload its collected data, at prescribed times (preferably the next morning) to either the user's smartphone or to the user's sleep monitor. The data is then later compared with the sleep data collected by the sleep monitor and/or the smartphone of the user, synched by time. In this manner, if the user has any sleep issues during a particular night, the data from the DM device (representing the sleep partner) may be reviewed to determine if the user's sleep event was influenced by the partner's movements, sound, or temperature.

For example, if the user's sleep data shows a disruption event at 3:35 AM where she is awakened from a light stage of sleep, and data collected from her sleep partner shows sudden movement at exactly 3:35 AM, then a correlation between her disruption and his movement at 3:35 AM may be assumed. If this type of disturbance occurs regularly, then corrective action may be necessary to ensure that the user's sleep quality is at least maintained or even improved. One possible corrective action could be to monitor the sleep of the user's partner to determine why he is moving so much while sleeping. When the user's partner's sleep issues are corrected, the user's sleep will benefit. Other corrective actions may include the use of separate beds.

It is appreciated that the monitor device shown in FIG. 1 and FIG. 4 can also be configured to implement the functions described herein by the DM device. In that regard, the DM device can be considered a specific embodiment of a sleep monitor device as contemplated by the present disclosure. For example, a smart phone or another IoT device with the described sensing components can be used as a DM device herein.

According to some embodiments of the present invention, the present system may determine an association between user movement during sleep at a certain time in the morning with the loud sounds of a passing train, garbage truck or airplane. These sources of sound all follow schedules and are somewhat predictable. The system reviews the schedule of various possible sources of sound (e.g., an airplane, a passing train, or garbage truck) using the Internet and generates white noise at the scheduled time to help block out the harshness of the intruding sound until it passes. The system may also detect loud sounds (usually emanating from outside) over time, as heard in the user's bedroom and establish daily, weekly or other patterns which may be used to predict future sound disturbances.

In some embodiments of the present invention, a sleep monitor may perform automatic response-feedback tests as a user sleeps to help find a "sweet spot" of factors which would ensure the user achieves high quality sleep (and a high sleep score).

According to the invention, the automatic tests include introducing different types of generated sounds, different levels of light, different room temperatures, humidity levels, air-quality, and air circulation, etc. The generated sounds may include various types of music, white and similar "colored" noises, and various nature sounds (e.g., babbling brook, distant thunder, etc.). The monitor could either include appropriate speakers and sound-generating circuitry, or connect, directly or wirelessly to other devices that can offer the desired sounds, and produce other sleep environment conditions desired. In an example, the sleep monitor can the operation of the connected sound generating device to perform the prescribed test, and can similarly connect to various Internet-of-Things (IOT) devices around the house using the home network to control bedroom lighting, bedroom temperature, humidity and air flow, etc.

An example of a test could include the following steps:
1) Sensing to determine if a user is asleep and in a preferred stage of sleep;
2) Performing a first measurement of movement and sound of the user to determine a baseline level of quality of sleep, and recording the results (This step may rely on sleep history data of the user to establish the baseline);
3) Activating, within the bedroom, a predetermined sound, at a predetermined volume, for a predetermined period of time;
4) Performing a second measurement of movement and sound of the user and recording the second-measurement results (this step may be performed during step 3, or after step 3 is complete);
5) Comparing the second-measurement results with the baseline results to determine noticeable differences, either negative or positive.
6) Recording test details and test results; and
7) Repeating steps 1-6, except at step (3) change the sound, the volume level and/or the duration of the sound.

By performing these tests, the present system can determine how a user's sleeping behavior will react to specific stimuli (sounds, lights, air conditioning, etc.). The tests may be performed randomly on different nights for various periods of time, preferably without the user being aware. Of course, the user may be aware when the tests will be performed and may even control which stimuli will be used during the test and at what ranges (e.g., max and min volume levels). Regardless, the user will be informed of the test results, such as shown below:

Sample Test Results:

| | |
|---|---|
| User Name | Bob |
| Test Date | Jun. 26, 2018 |
| Test Time Period | 3:05am-3:15am |
| Applied Stimulus | SOUND - Distant Thunder |
| Duration | 10 minutes |
| Intervals | 2 minutes |
| Changing Parameter | Volume change Min to Max |
| Starting Volume | Level 1 |
| End Volume | Level 5 |

| Interval | Volume Level | Time Measured Sleep Score: |
|----------|--------------|---------------------------|
| 1 | 1 | 79 |
| 2 | 2 | 81 |
| 3 | 3 | 74 |
| 4 | 4 | 71 |
| 5 | 5 | 67 |

Conclusion: Test data shows that based on Sleep Score, Bob responded well to Distant Thunder Sound at Volume Levels 1 and 2 and not well at Volume Levels 3, 4 and 5.
Recommendations: Introduce Distant Thunder Sound at Volume Level 1 or 2 for improved sleep score.

The above exemplary test results illustrate the results of just one test using one sound, at five different volume levels for a very short duration. In some embodiments, the present system can perform such tests continuously at different sampling times of the night and different nights of the year, with or without the user's knowledge. The present system preferably applies many different stimuli (including environmental conditions), one at a time, or in combination, changing different relevant parameters of each stimulus. The present system can operate at all different times to generate a comprehensive profile of how various stimuli and environmental conditions can affect a user's sleep score, both positive and negative. The duration of each tested stimuli may have to be longer than 2 minutes shown in the above example to accurately measure a meaningful change in sleep behavior.

According to other embodiments of the present invention, a monitor located within the bedroom of the sleeping user can include various calibration sensors for the purpose of calibrating itself to ensure accurate measurements are obtained based on various environment factors, such as room size, room shape, and how sound is reflected within the room. The size and shape of the bedroom can be determined automatically using known techniques based, for example, on radar, LIDAR, and ultrasonic transducers, or other measurement systems, devices or techniques.

Certain aspects of a user's bedroom may affect sensor measurements and impact weighting of certain factors. For example, a busy street outside may generate unwanted noise within the bedroom and adversely affect sound-related measurements. A baseline noise level may have to be determined for a period of time before accurate monitoring data can be assured. Any background "din" of a user's bedroom may be accounted for or reduced using known phase-based noise-reduction or noise-cancellation techniques.

Additionally, the type, size and relative location of items in a bedroom, as well as the materials that these items are made from, and other factors may also influence monitoring and sensing measurements and are preferably accounted for. It is well known, for example, that a room with carpeting and heavy drapes will not reflect much sound, yet a room with bare wood floors and empty walls will.

In some embodiments, the present system or monitor device can allow a user to take a picture (or several pictures, or a 360-degree picture) of the user's bedroom and upload the digital pictures to the present system. Object recognition software can then be used to analyze the uploaded images to determine the size, type and location of various objects located in the user's room. The software can also use this information to estimate the size and shape of the bedroom.

In some embodiments of the present invention, the present system or device can instruct a user to take pictures outside the bedroom window using his or her smartphone and upload the digital images to the system (if the monitor device is not the smartphone itself). The system can then use the metadata associated with the images to establish direction and GPS location. With this information, and any detected objects within the image itself, the present system can recognize or understand based on geographical location what is located nearby the user's house which may have a potential to disrupt or influence the user's sleep. For example, if the GPS information derived from the metadata of an uploaded image indicates that the user lives near a factory that starts operating at 5:00 AM each day, clearly this may be an issue regarding the user's sleep quality, and will likely have to be accessed further. Also, to obtain user geographic location, the present system may also access the user's GPS data provided by the user's smartphone, or use inputted address information provided by the user.

In some circumstances, it is important for the monitor device of the present system to be properly located next to a user's bed. The device may provide a user with a positioning test during initial setup that uses Doppler radar transducer 20 while instructing the user to lay on his or her side of the bed, first on his or her left side, then his or her right side and then on his or her back, and finally on his or her stomach. The user would be instructed to continually pat their upper leg or stomach with their hand, depending on their prone position. The monitoring device can use known data to determine if the patting movements of the user's hand during the test matches a known range and orientation of the device. Corrections can be passed to the user and the test repeated for confirmation. LED lights may be provided on the sides of the monitor to help instruct the user regarding which direction he or she should rotate the device during calibration. Other known distance-measuring sensors may be used to help ensure that the device is sufficiently close to the user during setup. Additionally, the calibration process of the present system may instruct a prone user to breathe as if they are sleeping, including providing "fake" snoring sounds, and counting to 10 using a normal speaking voice. The monitor can record these sounds during the test and determine relative distance based on establish sound amplitudes measured at different distances. Other tests may include speaking with a television on in the room, and having both the user and the user's partner perform a speaking test.

Figure 5:
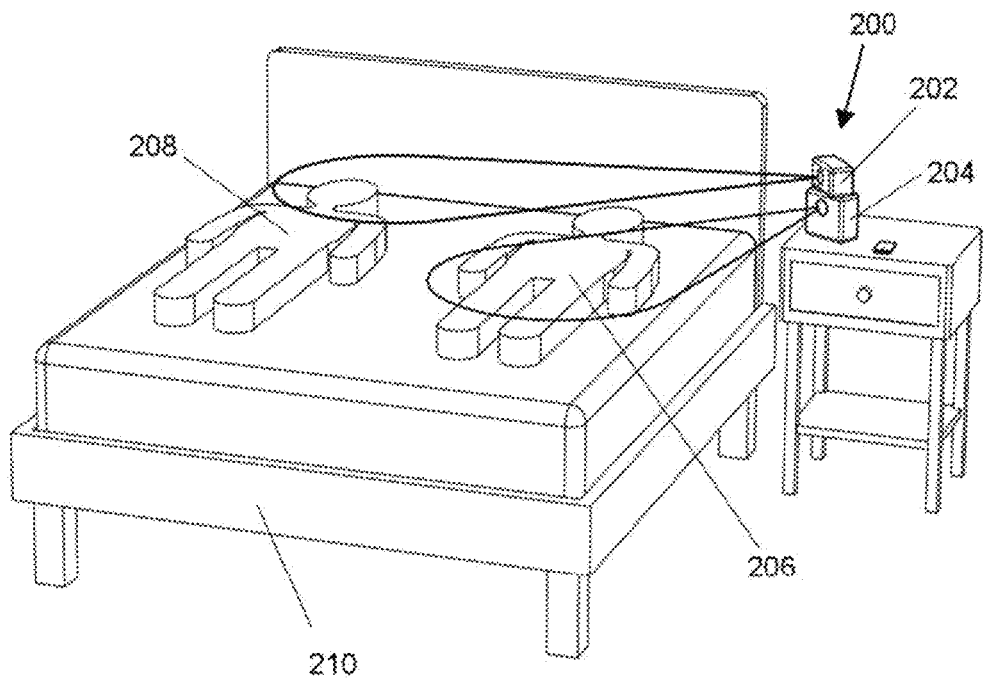
FIG. 5 is a perspective view of a bedroom showing a bed with two users sleeping thereon, and a sleeping monitor having angularly displaceable radar transducers, according to some embodiments of the invention.

In some embodiments of the present invention, and referring to FIG. 5, a monitor 200 is includes two separately moveable Doppler radar transducers 202,204 (or other similar movement sensors), one for each person 206,208 in a bed 210. The above-described calibration techniques can be used to focus each transducer on each respective partner sleeping in bed 210. Monitor 200, with its dual transducers 202, 204 may be positioned at either side of the bed, on a bedside table 212 with one transducer 202 being located above the other 204. The higher transducer 202 is used to monitor the more distant partner, since this higher transducer must "see" over the closer user. The lower transducer 204 may monitor the closer partner in bed.

Figure 6:
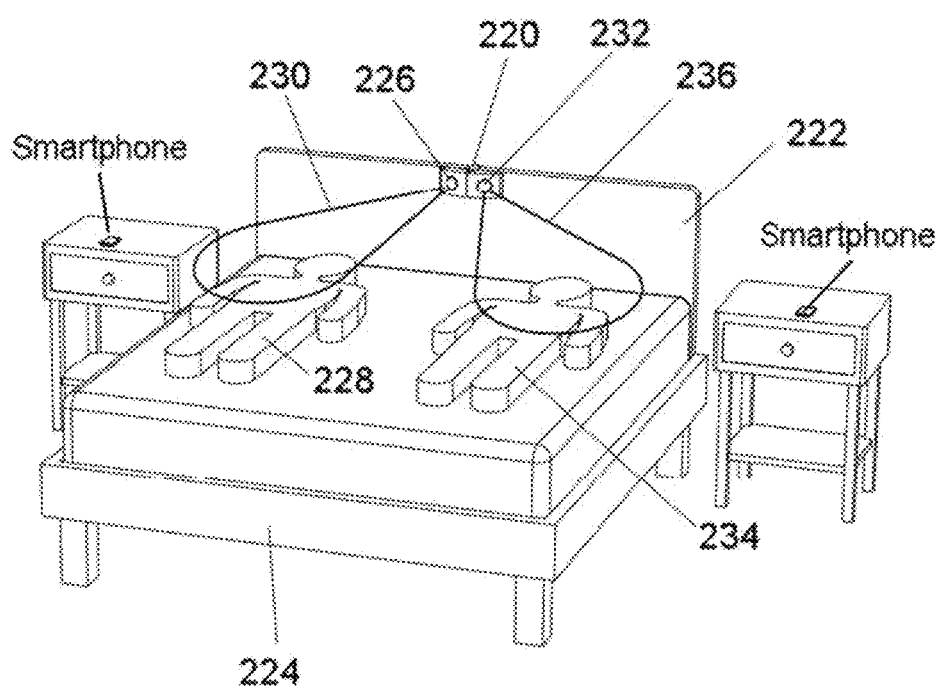
FIG. 6 is a perspective view of a bedroom showing a bed and a headboard with two users sleeping thereon, and a sleeping monitor attached to the headboard, according to some embodiments of the invention.

In some embodiments of the present invention, referring to FIG. 6, a monitor 220 may include appropriate fastening hardware (not shown) to allow the monitor to be mounted on a headboard 222 of a bed 224 (in the center). Monitor 220 may also similarly be mounted to a wall (not shown) adjacent to the headboard, on the ceiling (not shown) over bed 224, or on other walls (not shown) of the bedroom, as appropriate. In the case of mounting monitor 220 on headboard 222 of bed 224, as shown in FIG. 6, a left-side radar transducer 226 is positioned within monitor 220 and is aligned to monitor a left-side user 228 (a user sleeping on a left-side of bed 224), covering a left field of view 230. Similarly, a right-side radar transducer 232 is positioned within monitor 220 and is aligned to monitor a right-side user 234 (a user sleeping on a right-side of bed 224), covering a right field of view 236. Monitor 220 preferably otherwise operates in a similar manner to monitor 200, described above. By having the monitor located symmetrically and above both sleeping users, the respective left and right radar transducers 226, 232 will have a clearer field of view of left and right users, 228, 234, as shown in FIG. 6. Monitor 220 preferably includes two directional microphones (not shown), one for each sleeping user. It may also include a single thermometer and light sensor. Monitored user data of both radar transducers may be stored together in a single memory, but kept separate, as understood by those skilled in the art.

Additionally, a displaceable single Doppler radar transducer may be provided in combination with an appropriate drive mechanism to allow for controlled and selective angular displacement of the transducer between two or more positions. The monitor here will allow a controller to selectively move the single transducer at prescribed times between a first position to focus on and monitor a first user in bed, and a second position to focus on and monitor a second user in bed. The monitor would continue to move the transducer between the two positions so that both people in bed can be effectively monitored throughout the night, albeit alternately.

Referring back to FIG. 1, other types of sensors (auxiliary sensors), according to this invention may be included with the sleep monitor 10. Such auxiliary sensors may include a thermometer 25 for measuring bedroom temperature, a light sensor 26 for measuring any light in the bedroom, a microphone 27 for measuring sounds that can be heard in the bedroom. The data collected from these auxiliary sensors 25, 26, 27 is combined with the data from radar transducer 20 and time-stamped by processor 12 so collectively, the data from different types of sensors may be analyzed concurrently, locally, using processor 12, or at a later time, using either local processor 12, or a remote server (not shown). In this manner, additional factors of a user's sleeping environment may now be considered when analyzing a user's sleep behavior and generally, as in many fields of study, the more information, the better. For example, if the collected data of a certain user shows sudden body movement by the sleeping user at around 4:15 AM every Monday morning, the data from microphone 27, light sensor 26, and thermometer 25 can then be reviewed for clues at what is happening at that time. Perhaps in this example, the microphone data reveals the distinct sounds of a garbage truck outside picking up the trash at this exact time. Based on this, the user would be given a recommendation to either wear ear plugs on Mondays or perhaps have double-pane windows installed.

According to the present invention, such auxiliary sensors 25, 26, 27 may be used to detect conditions within the user's bedroom. Processor 12 of monitor 10 may be used to determine if any measured parameter or condition within the bedroom exceeds a predetermined value. In such instance, the user can be informed and corrective measures suggested automatically. For example, if the illumination level in the bedroom is measured by light sensor 26, and the value exceeds a certain predetermined level (as decided by the user or as determined using historical data of the user's bedroom), the present system will inform the user (either by text, email, or through the present software program) of the excessive light condition. In this example, the present system will provide an appropriate suggestion to the user, such as turning off all lights before going to bed, providing a sleep partner with a book-light, if appropriate, using an eye mask, or installing blackout blinds to prevent light from entering the room through windows. If loud sounds are detected in the bedroom at bedtime or during sleep time, the present system may suggest that the user locate the source of the sound and try to eliminate it. If this is not possible, the present system will suggest that the user use ear plugs or an appropriate sound-cancelling device.

In some situations, it may be determined that a user's measured movements while sleeping consistently increase or otherwise change, possibly indicating a level of restlessness, whenever the user's sleep-partner enters the bed. In such instance, the present system would suggest a new bedtime for either the user or the partner so that the user would more likely reach a deep sleep stage when the partner enters the bed and therefore would be less likely to be disturbed. In more extreme cases, separate beds may be required, or at least the use of separate mattresses, box springs and frames, combined together with a common thin mattress topper. This arrangement would allow two bed partners to sleep in a common bed and be close to each other, but at the same time would help mitigate the migration of vibration or strong displacements across the bed.

Figure 7:
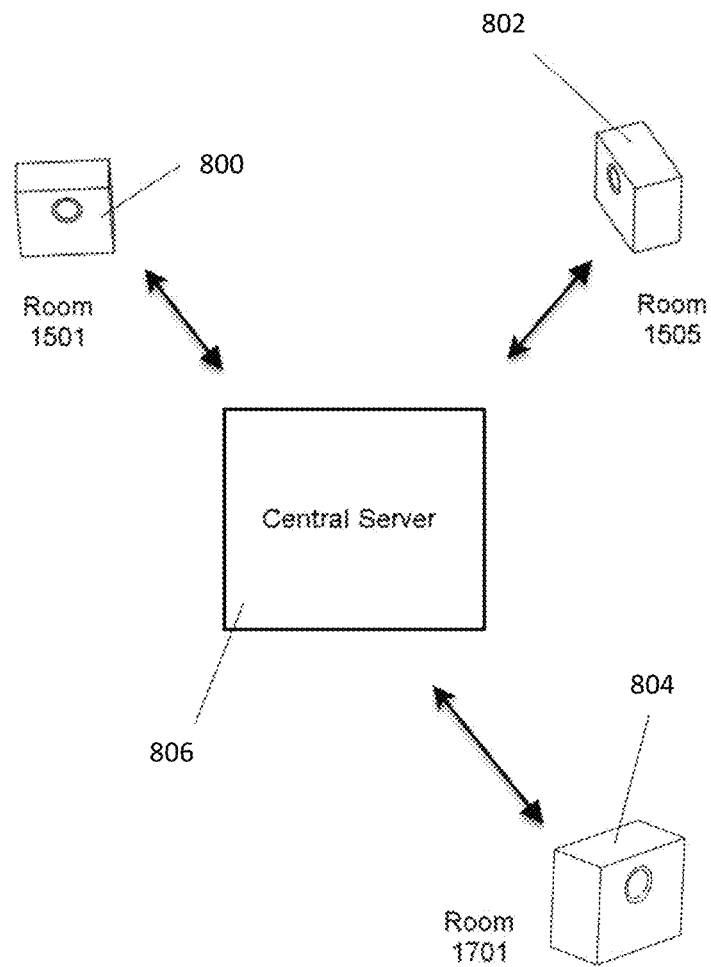
FIG. 7 is a schematic illustrating three apartment rooms, each including a monitor and a central server, according to some embodiments of the invention.

In some embodiments of the present invention, a monitor as illustrated in FIG. 7, may be operatively connectable to other nearby monitors via a central server. For example, a monitor 800 is being used in room 1501, monitor 802 is being used in room 1505, and a monitor 804 is being used in room 1701 in an apartment complex. In this arrangement, noises emanating rooms or hallways in or near these three rooms can be picked up by the microphones 27 of each of the monitors 800, 802, and 804. A central server 806 is in communication with all three monitors 800, 802, and 804 and as such can be used to identify and pin-point the location of the unwanted noise. Known triangulation techniques can be used to locate the source of the noise by using the three spaced microphones 27. Also, linked monitors of an apartment complex or neighborhood may be used to show the history of excessive noise in the area, either from another apartment or house, or an outside noise at any time during the day or night. This information may be used and offered to potential renters or buyers of an apartment or home to learn what the quality of life is at the particular location, at least regarding sound.

As mentioned above, based on known factors of a common good sleeping environment, monitor 10, according to the present invention, uses auxiliary sensors 25, 26, and 27 to analyze the environment of the user's bedroom and calculate an "environmental sleepability" rating. According to the invention, the user performs an environment test at an initial installation time (or any other time) and be given not only an environment score, but also suggestions on how to improve the score, i.e., what can be done to the bedroom environment to make the sleeping conditions better for the user. This information is helpful not only for self-assessment of sleeping conditions, but also for property management, property sales, vacation rentals, etc. For example, a landlord can provide a certified environment sleeping score (assuming it is a good score) to prospective renters to show that a particular apartment has a good sleeping environment. Multiple monitors 10 can also be linked within a large house to rate multiple rooms and the information can then be used to map a floor-plan to track inter-room disturbances.

As described above, a bedroom environment-testing device may be used to measure sound levels, light levels, temperature, air quality (VOCs, humidity, pollen, dust) and vibration (trains rumbling by in the night) of any bedroom and generate an environment sleep score. The environment-testing device can be the monitor device itself or be a standalone device that only performs the bedroom-environment test and can communicate with the monitor device, but does not include sleep-monitoring components. According to some embodiments of the invention, the environment-testing device may be a user's smartphone running a dedicated software application, wherein the application would instruct the sensors of the smartphone to "record" data over a prescribed period of time. The phone's light sensor can be used to detect light within the bedroom. The phone's accelerometer can be used to detect vibration. The phone's microphone can be used to pick up any sounds within the room. Temperature and other air-quality parameters may be recorded using an accessory mechanically and electrically attached to the phone that would have appropriate air-quality sensors.

The user's smartphone running the software program can be positioned in a bedroom for a period of time (preferably throughout the day and night) to perform the required tests. As the phone sensors operate, whenever the phone is located in the bedroom, the running software program can create a history of data based on light, sound and vibration. This information can be used to generate a room quality score overtime by having the user continue the test the bedroom whenever the phone is in the bedroom. The data can be used to generate a score that indicates the suitability for sleep, such as generally quiet and relatively dark, with cool air of good quality. All the parameters have ranges and acceptable limits so perfection is not required, nor easily obtained. The program is preferably standardized so that a bed and breakfast room for rent, for example, can be tested by the owner for different days of the week (day and night) and different days of the year. The test results can be provided to any interested party and the scores may be compared to the user's bedroom score. If the user has an environment sleep suitability score of 87 at home, for example, and the B&B room has a score in the low 70's for the month of May, then the user may anticipate sleep issues during his or her stay and make other arrangements. The details of the score may be expanded for closer inspection. It may be, in this example, that the room score drops suddenly at 9:30 AM because of nearby traffic sounds. This may be OK for the user since the user would expect to be up and shopping in the nearby town by that time.

Also, according to the invention, the score can be divided into specific hours and ranges of hours so that the user may input his or her desired or typical sleep time and compare the resulting score of the B&B, or other location with that of his or her own bedroom.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A computer-implemented method for improving sleep of a user, comprising:
    based on a user profile including biographical information of the user and information provided by one or more electronic monitor device measuring activity or physiological status of the user, calculating, by using at least one computer processor, a sleep score of the user's upcoming night's sleep, the sleep score being indicative of a quality of the sleep and determined using a machine learning model trained to predict sleep quality based on historical user activity data, physiological data, and sleep outcomes;
    generating an interactive graphical user interface (GUI) for a digital display viewable by the user, the interactive GUI being configured to display a representation of the sleep score, the representation of the sleep score including a current sleep fuel value displayed as a fuel gauge to indicate a quantity of sleep needed to improve the activity or physiological status of the user, the fuel gauge being dynamically updated in real time based on user inputs or updated physiological data received from one or more monitoring devices;
    generating one or more recommendations for the user based on the sleep score to improve the activity or physiological status of the user; and
    providing the one or more recommendations to the user on the interactive GUI of the digital display for the user to improve the user's upcoming night's sleep.

2. The method of claim 1, further comprising:
    tracking the user's actions to calculate the current sleep fuel value for predicting the current night's sleep quality, wherein the machine learning model processes the user profile to identify patterns predictive of the quality of the sleep.

3. The method of claim 2, wherein the interactive GUI comprises a gauge showing the current value and a target value.

4. The method of claim 2, wherein calculating the current sleep fuel score comprises using signals received from one or more monitoring devices, wherein the machine learning model processes real-time data from the one or more monitoring devices to update the sleep score.

5. The method of claim 2, wherein calculating the current sleep fuel score comprises using an input provided by the user.

6. The method of claim 2, wherein calculating the current sleep fuel score comprises scoring a decision provided by the user as an input to the interactive GUI.

7. The method of claim 1, wherein calculating the sleep score comprises assigning a weight to each of a plurality of factors including air quality and the user's physical activity.

8. The method of claim 1, wherein the providing the recommendation is in response to a query from the user.

* * * * *